United States Patent [19]

Caletti et al.

[11] 3,922,720

[45] Nov. 25, 1975

[54] CARRIAGE ASSEMBLY FOR A MAGNETIC DISC STORAGE DRIVE

[75] Inventors: Robert H. Caletti, Menlo Park; Timothy W. Martin, San Jose; Ronald L. Swain, Sunnyvale, all of Calif.

[73] Assignee: Information Storage Systems, Inc., Cupertino, Calif.

[22] Filed: Jan. 9, 1974

[21] Appl. No.: 432,009

[52] U.S. Cl. .............. 360/106
[51] Int. Cl. .............. G11b 21/08
[58] Field of Search .............. 360/78, 106

[56] References Cited

UNITED STATES PATENTS 3,643,242 2/1972 Bryer .............. 360/106
3,721,967 3/1973 Englert et al. .............. 360/106

*Primary Examiner*—Bernard Konick
*Assistant Examiner*—Robert S. Tupper
*Attorney, Agent, or Firm*—Gerald L. Moore

[57] ABSTRACT

A carriage assembly for supporting a head accessing mechanism in a magnetic disc storage system including a pair of parallel rails having top flat surfaces and opposing side flat surfaces for supporting a movable carriage having roller bearings adapted to ride on the top surfaces and against the side surfaces while extending between the rails for movement along the longitudinal axis of the rails to access the heads relative to the recording disc.

5 Claims, 3 Drawing Figures

CARRIAGE ASSEMBLY FOR A MAGNETIC DISC STORAGE DRIVE

BACKGROUND OF THE INVENTION

In some magnetic disc storage systems a plurality of read/write heads are supported in a manner for movement along the surfaces of rotating discs so as to access various data tracks for the reading and writing of information. The heads are supported on a carriage which moves along a longitudinal axis toward and away from the axis of rotation of the discs. The trend is to record the data on tracks which are more closely spaced thereby requiring that the support for the carriage be more precise with less tolerances which otherwise would limit the accurate positioning of the heads.

In the past rather expensive carriage assemblies have been utilized to support and position the read/write heads. Because of the complexity of such head assemblies it has been impossible to use more economical manufacturing methods such as extruding processes for the formation of the supporting rails and the head support commonly referred to as T-block. It is the purpose of this invention to improve on the previously used carriage assemblies by providing one enabling the positioning of the head with less tolerances due to the carriage assembly and yet being of a simplified design so that more economical methods of manufacture can be employed.

SUMMARY OF THE INVENTION

A carriage assembly for a magnetic disc storage apparatus having a carriage support base plate on which are positioned a pair of rails extending in a parallel relationship along a longitudinal axis and having a flat top surface and flat side surfaces at least partially facing the opposite rail and the base with a movable carriage having roller bearings for riding on the top flat surfaces and for abutting the side surfaces and being supported on a structure extending between the rails and centered about the longitudinal axis so as to permit precise movement and positioning of the carriage along the longitudinal axis.

DESCRIPTION OF THE INVENTION

Figure 1:
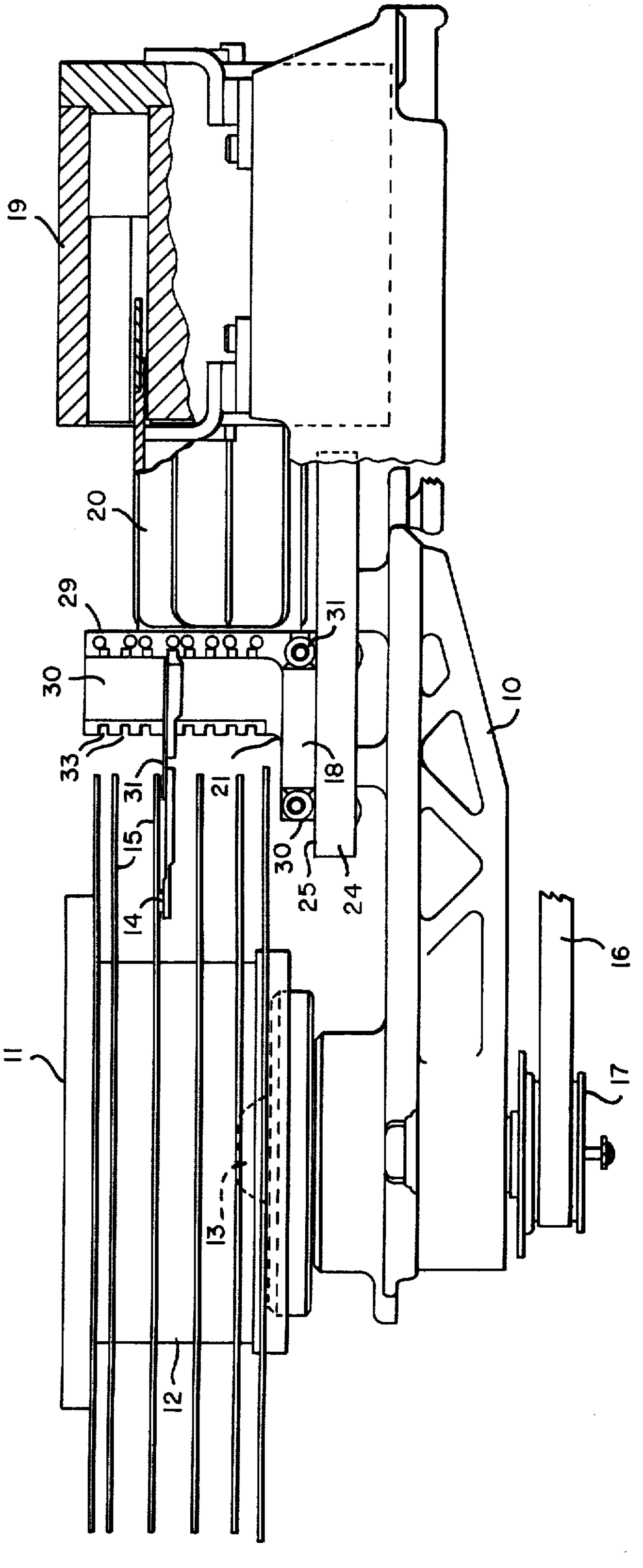
FIG. 1 is a side plan view of a carriage assembly embodying the present invention.
Figures 2, 3:
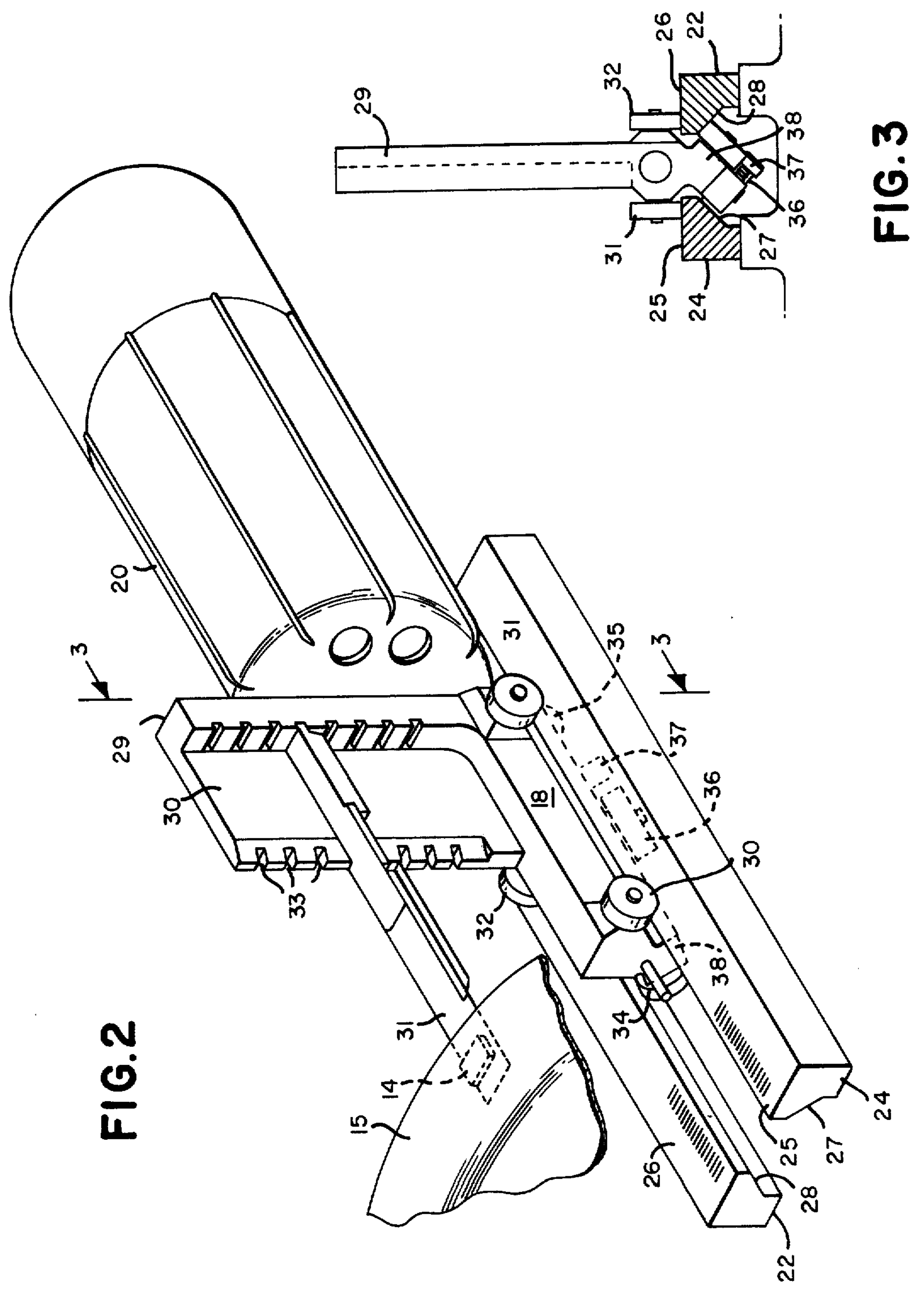
FIG. 2 is a perspective view of the apparatus of FIG. 1.
FIG. 3 is a cross-sectional view along the lines 3—3 of FIG. 2.

In FIG. 1 is shown a carriage assembly for a storage drive comprising a base plate 10 on which is supported a magnetic disc pack 11 and a carriage assembly 21 for supporting read/write heads 14 in a manner to move across a horizontal surface of one of a plurality of discs 15 for the reading and writing of information thereon. The disc package 11 comprises a central support 12 which fits over a hub 13 journalled in the base plate such that when the drive belt 16 is power driven by a motor (not shown), the pulley 17 rotates the hub which in turn rotates the disc pack and the disc 15 about a vertical axis of rotation. Thereafter by movement of the carriage 18 along the longitudinal axis toward and away from the axis of rotation of the disc pack, data can be recorded and read back from a magnetic coating on the disc.

For actuation of the carriage assembly there is provided a linear motor comprising a stationary magnetic core 19 and a movable coil assembly 20. The coil assembly is fixed to the carriage 18 while the core is fixed to the base plate such that by proper energization of the coil through electrical leads (not shown) movement of the coil can be effected toward and away from the core so as to move the carriage along the longitudinal axis. Operation of such linear motors is well known in the disc drive field of technology. Such movement of the carriage shifts the read/write heads 14 along the surfaces of the rotating discs for precise positioning at various data tracks forming concentric circles on each disc surface, which concentric circles form data tracks for the recording of information. The precision with which the read/write head can be positioned is dependent to a large extent on the tolerances within the carriage assembly and it is the provision of a precision manufactured yet economical carriage assembly to which this invention is dedicated.

In accordance with the present invention the carriage assembly comprises a pair of parallel positioned rails 22 and 24 fixed to the base plate 10 in some suitable manner so as to support the carriage for its longitudinal movement along a longitudinal axis extending toward and away from the disc pack. These rails are mounted to extend parallel to one another and are centered about a longitudinal axis preferably intercepting the axis of rotation of the hub 13. The rails include top surfaces 25 and 26 and side surfaces 27 and 28 which partially face the opposite rail and partially face the base plate. The rails are of identical cross-section throughout their length to enable fabrication by economical methods such as an extrusion process and are identical to each other. Thereafter the flat surfaces are machined to provide a smooth precision ground track along which the carriage assembly can ride.

The T-block 29 comprises a vertically extending support 30 to which are fixed one or more head supporting arms 31 extending horizontally toward the disc pack. The arms are fixed to the T-block in any suitable manner so as to interfit into the slots 32 in the support. The read/write heads 14 which can be of standard well-known design are supported on the extending end of the support arms. The T-block is supported on a roller carriage 18 and is generally centered about the longitudinal axis of movement of the assembly. The carriage comprises a downwardly extending section 38 projecting between the rails 25 and 26. Mounted on the roller carriage to one side are a pair of rollers 30 and 31 positioned to ride on the top surface 25 of the rail 24. On the other side of the carriage is a roller 32 positioned to ride on the top surface 26 of the rail 22. On the lower extending portion of the roller support are three additional rollers including rollers 34 and 35 rotatably mounted in a position to abut the sidewardly extending surface 28 of the rail 22 and a single roller 36 rotatably supported to abut the sidewardly extending surface 27 of the rail 24.

The roller 36 is biased by the spring-loading support 37 to press closely against the rail surface 27 and thereby reduce any tolerances between the rollers and the rail surfaces so as to precisely hold the carriage in place relative to the rails. Because of the position of the spring-loaded roller in facing both outwardly and upwardly, the force of the spring-loading mechanism biases both the sidewardly facing rollers and the downwardly facing rollers thereby holding the carriage assembly tightly against the rails.

Thus by the present carriage assembly configuration the rollers are supported on a roller support which is quite small in cross-sectional size because it extends between the rails only and mounts the rollers in a manner so as to abut facing surfaces on the rails for holding the carriage tightly while permitting longitudinal movement along the longitudinal axis of the rails. The carriage also has a smaller cross-sectional size thereby centering the carriage assembly more closely about the longitudinal axis of movement and adding stability to the machine. Further, the vertically extending roller carriage counter balances the carriage about the moment of force exerted by the linear motor thereby to reduce any vibration or sidewise movement during an accessing motion of the carriage assembly.

That which is claimed is:

1. A disc storage apparatus having a carriage assembly for supporting magnetic read/write heads that access selected data tracks on magnetic discs, consisting of:

a carriage support baseplate having a central longitudinal axis defining the direction of travel of the carriage as it moves back and forth to position the heads relative to selected data tracks, first and second rails supported on the baseplate in parallel spaced relationship one to each side of the longitudinal axis with each rail having a flat top surface and a flat side surface at least partially facing the opposite rail, and a moveable carriage having rotatably mounted thereon a first set of roller bearings having at least one roller bearing riding on each of the rail top surfaces and a second set of roller bearings having at least one roller bearing bearing against each of the flat side surfaces for travel along the longitudinal axis.

2. A disc storage drive as defined in claim 1 wherein said rail flat side surfaces at least partially face the baseplate.

3. A disc storage drive as defined in claim 1 wherein said carriage includes three roller bearings in each set for support on the rails.

4. A disc storage drive as defined in claim 1 wherein said carriage includes a section extending between the rails on which are mounted the rollers which bear against the flat side surfaces of the rails.

5. A disc storage drive as defined in claim 4 wherein at least one of said rollers is spring loaded against the cooperating rail surface.

* * * * *